United States Patent [19]

McDonogh et al.

[11] Patent Number: 5,429,812
[45] Date of Patent: Jul. 4, 1995

[54] MANUFACTURE OF PEROXIDIC COMPOSITIONS

[75] Inventors: Colin F. McDonogh, Appleton Park; Neil J. Sanders, St. Helens, both of England

[73] Assignee: Solvay Interox Limited, Warrington, England

[21] Appl. No.: 70,376

[22] PCT Filed: Dec. 3, 1991

[86] PCT No.: PCT/GB91/02138
§ 371 Date: Jun. 8, 1993
§ 102(e) Date: Jun. 8, 1993

[87] PCT Pub. No.: WO92/11200
PCT Pub. Date: Jul. 9, 1992

[51] Int. Cl.⁶ ............................................. C01B 17/98
[52] U.S. Cl. ..................................................... 423/521
[58] Field of Search .......................................... 423/521

[56] References Cited

U.S. PATENT DOCUMENTS

| | | | |
|---|---|---|---|
| 2,926,998 | 3/1960 | D'Addieco et al. | 423/521 |
| 3,900,337 | 8/1975 | Beck et al. | |
| 3,939,072 | 2/1976 | Laforte | 210/96.1 |
| 5,141,731 | 8/1992 | Meier et al. | 423/521 |

FOREIGN PATENT DOCUMENTS 738407 10/1955 United Kingdom .

*Primary Examiner*—Wayne Langel
*Attorney, Agent, or Firm*—Larson and Taylor

[57] ABSTRACT

Production of peroxomonosulphuric acid (Caro's acid) by reaction between concentrated hydrogen peroxide and sulphuric acid solutions can be impaired substantially when substoichiometric amounts of sulphuric acid are employed.

The problem is ameliorated or removed by first forming a body of sulphuric acid-rich fluid (usually the smaller volume) and thereafter introducing into that body of fluid the hydrogen peroxide solution (usually the larger volume). The reaction mixture progressively becomes sulphuric acid-lean. The body of fluid is advantageously either concentrated sulphuric acid itself, or a premix formed by reaction between hydrogen peroxide and at least an equimolar amount of sulphuric acid. The process is particularly suitable for making Caro's acid when from 0.02 to 0.5 moles of sulphuric acid is employed per mole of hydrogen peroxide.

6 Claims, No Drawings

MANUFACTURE OF PEROXIDIC COMPOSITIONS

The present invention relates to the manufacture of peroxidic compositions and more particularly to a process for the manufacture of peroxomonosulphuric acid-containing solutions.

Peroxmonosulphuric acid, which is alternatively called Caro's acid, after the person which first made it, can be made by reaction between concentrated hydrogen peroxide and concentrated sulphuric acid or even oleum. The reaction can be represented as:

$$H_2O_2 + H_2SO_4 = H_2SO_5 + H_2O$$

Many trials conducted by the Applicant have confirmed that the reaction does not proceed completely, but attains an equilibrium for the two reactants and two products. These trials were conducted using an excess of sulphuric acid above the theoretical ratio of 1:1, and often in the region of about 2:1 to 5:1 in order to favour the conversion of hydrogen peroxide rather than sulphuric acid to Caro's acid. Provided that appropriate care was taken to avoid significant decomposition of the peroxidic compounds such as by agitating and cooling the reaction mixture sufficiently, the trials demonstrated that equilibration occurred very quickly when the reactants were brought into contact, and the position of the equilibrium depended consistently upon the overall concentrations of the two reagents and the mole ratio of $H_2O_2$ and $H_2SO_4$ employed, ie it depended upon how much $H_2O_2$, $H_2O$ and $H_2SO_4$ was added. The choice of the order of introduction of the reactants to each other did not affect the position of the equilibrium.

One of the attractive uses for Caro's acid solutions comprises oxidative detoxification of effluent solutions, of which one example comprises inorganic cyanides or nitriles. During such detoxification processes, it is often desirable to maintain at least a minimum alkaline pH, to avoid the evolution of a noxious gas. The use of Caro's acid solutions accordingly requires the addition of a neutralising alkali in an amount that is proportionate to the total amount of acid added. The use of Caro's acid solutions made using an excess of sulphuric acid not only increases the cost of neutralisation, but can increase the extent of formation of insoluble sulphate precipitates if an alkaline earth metal neutraliser such as lime is used.

Accordingly, and in order to reduce the amount of sulphuric acid that requires neutralisation in use, investigations have been made into the production of Caro's acid solutions from mixtures containing a substoichiometric amount of sulphuric acid, ie an excess amount of hydrogen peroxide.

However, it has been found that when a substoichiometric amount of sulphuric acid is reacted with aqueous hydrogen peroxide, the proportion of Caro's acid that is produced can be much less than the expected equilibrium amount, ie less than the amount expected by extrapolation from trials conducted using excess sulphuric acid, depending upon the way in which the reaction is carried out. On the other hand, it has also been found that if process is carried out in a different way, the proportion of Caro's acid formed can approach or approximate to the expected amount.

It is an object of the present invention to identify process conditions in which the problem of impaired production of Caro's acid is ameliorated or avoided.

According to the present invention there is provided a process for the production of Caro's acid-containing solution by reaction between a concentrated hydrogen peroxide solution and a concentrated sulphuric acid solution characterised in that the total amount of sulphuric acid employed is substoichiometric relative to the hydrogen peroxide, and further characterised by the steps of first forming a body of fluid that is sulphuric acid-rich, and secondly introducing into said body of fluid the hydrogen peroxide solution with agitation, thereby causing the mixture progressively to become sulphuric acid-lean.

By the term sulphuric acid-rich herein is meant that the body of fluid contains greater than one mole of sulphuric acid per mole of hydrogen peroxide and correspondingly the term sulphuric acid-lean means that there is less than one mole of sulphuric acid per mole of hydrogen peroxide in the body of fluid.

It will be recognised that the simplest manifestation of a sulphuric acid-rich body of fluid consists essentially of an aqueous solution of the sulphuric acid, and conveniently the entire amount which is intended to be employed in the production of the Caro's acid-containing solution. An alternative composition for the body of sulphuric acid-rich fluid which can be contemplated comprises an equilibrated solution obtained by mixture of concentrated hydrogen peroxide and sulphuric acid solutions in which the mole ratio of $SO_3$ to AvOx is at least 1:1. In making that calculation the $SO_3$ may be present as either $H_2SO_4$ or $H_2SO_5$ and the AvOx includes both $H_2O_2$ and $H_2SO_5$.

By first forming a sulphuric acid-rich body of fluid and thereafter introducing the hydrogen peroxide solution into it, it is possible to form a composition that approximates to the equilibrium mixture, despite using a substoichiometric amount of acid. In one way of viewing reactions this is an unusual sequence to advocate, because it entails introducing the larger volume into the smaller volume and the exothermic dilution of an acid by introduction thereinto of the diluent instead of its introduction into the diluent. However, the reverse addition technique, the usually expected sequence, namely introducing the sulphuric acid solution into the hydrogen peroxide solution, results in the generation of a composition in which a significantly smaller fraction of the reactants is converted to Caro's acid. The difference arises despite the fact that exactly the same solutions and mole ratios of reactants are employed. This is of practical value in that Caro's acid is in general a more powerful oxidant than hydrogen peroxide.

The value of the process according to the instant invention becomes more pronounced as the product becomes increasingly deficient in sulphuric acid. It is preferable to employ the invention process for making product having an $SO_3$:AvOx mole ratio of below 0.8:1. The difference in Caro's acid produced by the reverse addition process compared with the invention process becomes especially noticeable as the $SO_3$:Avox mole ratio is decreased below about 0.7:1, falling quickly to a fraction of about a tenth at a mole ratio of 0.5:1 and about a twentyfifth at a mole ratio of about 0.1:1.

Accordingly, it has been deduced by the inventors that the timing and manner of introduction of the reactants is of practical significance in determining the final composition of the product and is of especial practical importance for compositions containing very low amounts of sulphuric acid.

It will be recognised that especially when employing mole ratios of $SO_3$:AvOx at the lower end of the above-identified range, the volume of the hydrogen peroxide solution tends to be greater, or even substantially greater than the volume of the sulphuric acid solution. As a technique, therefore, it is contrary to the generally accepted tenets of introducing a smaller volume into a larger and also that of diluting sulphuric acid by its introduction into the diluent.

The instant invention process is of particular value in producing Caro's acid compositions from reagents in which the mole ratio of $SO_3$ to AvOx is up to 0.8:1, and is of especial significance when the amount of sulphuric acid is relatively low, such as when the $SO_3$:AvOx mole ratio is in the region of from 0.02:1 to 0.5:1.

The hydrogen peroxide solution employed in the present invention preferably contains at least 50% w/w $H_2O_2$ and normally contains from 50 to 75% w/w $H_2O_2$. The sulphuric acid solution preferably contains at least 90% w/w $H_2SO_4$ and often from about 94% to 98% $H_2SO_4$. One practical combination of reagents comprises the use of solutions of about 65% to about 70% hydrogen peroxide and about 94% to about 98% sulphuric acid.

The invention process can be carried out using a wide range of reaction temperatures. In one convenient method of operation, the sulphuric acid-rich body of fluid is held in an agitated vessel that is equipped with cooling means, such as a water cooling jacket, or cooling coils or a heat exchange unit and the hydrogen peroxide-rich solution is introduced therein until the desired mole ratio of $SO_3$:AvOx has been reached, the temperature of the reaction mixture being maintained at below about 60° C. throughout the reagent addition or brought quickly below 60° C. if that temperature is temporarily exceded. A convenient operating temperature can be selected in the range of from 0° to 50° C.

The invention process is particularly suitable for batch-wise production of Caro's acid-containing solutions. The overall reaction time is to at least some extent at the discretion of the process user and takes into account the heat-removing capacity of the apparatus employed. Naturally it will also take into account the overall mole ratios of the reactants. In a number of convenient embodiments, the period of introduction of the hydrogen peroxide solution into the body of sulphuric acid-rich fluid is selected within the range of from 10 minutes to 2 hours.

The Caro's acid-containing solutions produced by the present invention are particularly suitable for oxidative reactions in which it is desirable to restrict the total amount of acid employed, in that the conversion of sulphuric acid to Caro's acid is high and particularly so at $SO_3$:AvOx mole ratios below about 0.5:1 and where the presence of residual hydrogen peroxide is either benign or even beneficial, such as in oxidative waste treatment processes in the presence of alkaline earth metal salts that precipitate out, possibly as a fine precipitate that would be slow or expensive to separate out.

Having described the invention in general terms, specific embodiments will now be described in greater detail byway of Example only.

Comparisons R1 to R6 and Examples Ex3 to Ex6

All these Comparisons and Examples employed the same batches of reactants, respectively 98% w/w sulphuric acid laboratory reagent grade and 70% w/w hydrogen peroxide (Interox Chemicals Limited, distilled technical grade) and the mole ratio of $H_2SO_4$ to $H_2O_2$ specified in Table 1 below to yield a volume of about 150 mls. In all the Examples and Comparisons, the apparatus comprised a 500 mls flask, equipped with stirrer, thermometer and a cooling bath.

In Comparison R1 and Examples Ex3 to Ex6, the entire calculated amount of sulphuric acid solution was placed in the flask, and the hydrogen peroxide solution was introduced gradually into the stirred flask over a period of 30 minutes, and at such a rate that the temperature of the reaction mixture was maintained at between 0° and 5° C.

In Comparisons R2 to R6, the entire calculated amount of the hydrogen peroxide solution was placed in the flask and the sulphuric acid solution introduced gradually into the reaction mixture over a period of about 45 to 60 minutes and at such a rate that the temperature of the reaction mixture was maintained at below about 5° C.

The resultant compositions were analysed for hydrogen peroxide and for Caro's acid by the following standard wet analysis techniques, employing a cerimetric method for hydrogen peroxide and iodometric for permonosulphuric acid. The results are listed in Table 1 as % by weight in the composition, together with the proportion of AvOx (total from residual $H_2O_2$ plus $H_2SO_5$) in the final composition compared with the amount introduced.

TABLE 1

| Comp/ Ex No | Mole Ratio of reactants $H_2SO_4$:$H_2O_2$ | Initial contents of flask | Measured Concentration % w/w in the product | | % Avox Retained |
|---|---|---|---|---|---|
| | | | $H_2O_2$ | $H_2SO_5$ | |
| R1 | 2.0:1 | $H_2O_2$ | 1.35 | 39.9 | 96.8 |
| R2 | 2.0:1 | $H_2SO_4$ | 1.7 | 37.7 | 94.8 |
| R3 | 0.1:1 | $H_2O_2$ | 54.0 | 0.35 | 93.2 |
| Ex 3 | 0.1:1 | $H_2SO_4$ | 51.7 | 8.5 | 93.4 |
| R4 | 0.25:1 | $H_2O_2$ | 45.9 | 1.25 | 100 |
| Ex 4 | 0.25:1 | $H_2SO_4$ | 40.5 | 18.2 | 99.3 |
| R5 | 0.5:1 | $H_2O_2$ | 33.5 | 2.2 | 98.9 |
| Ex 5 | 0.5:1 | $H_2SO_4$ | 26.7 | 23.7 | 97.8 |
| R6 | 0.75:1 | $H_2O_2$ | 20.9 | 21.9 | 99.6 |
| Ex 6 | 0.75:1 | $H_2SO_4$ | 16.8 | 35.0 | 98.9 |

From Table 1, it can be seen that the both modes of reaction were carried out at five different mole ratios of $H_2SO_4$:$H_2O_2$. In R1 and R2, $H_2SO_4$ was in excess, and the resultant composition contained a very similar proportion of Caro's acid from both modes of reaction, thereby confirming that it is a matter of convenience and customer choice as to which mode is adopted when using a suprastoichiometric amount of sulphuric acid. However, when a sub-stoichiometric amount of sulphuric acid is employed, a significant difference in the composition of the final product is observed, even though the AvOx retention in the compositions is very similar. Comparing R6 and Ex6, the amount of Caro's acid produced in the Example is about 60% more than in the Comparison. It will be observed that the difference becomes much more exaggerated at lower mole ratios of $H_2SO_4$:$H_2O_2$. At 0.5:1, the comparison between R5 and Ex5 shows that over 10 times as much Caro's acid is produced using the Example process compared with the comparison process. At 0.25:1, the comparison between R4 and Ex4 shows that about 14.5 times as much Caro's acid is produced using the Example process compared with the comparison process. At 0.1:1, the comparison between R3 and Ex3 shows that over 24 times as much Caro's acid is produced using the Example process compared with the comparison process.

Examples 7 and 8

In these Examples, the process of respectively Examples Ex3 and Ex5 were repeated, but employing the calculated amount of a Caro's acid solution that had been made by reacting an equimolar amount of sulphuric acid and hydrogen peroxide as the body of sulphuric acid-rich fluid in the flask into which the residual amount of hydrogen peroxide solution was introduced. The 1:1 solution was made using the same sulphuric acid and hydrogen peroxide solutions as in the preceding comparisons and Examples by the method of R1, ie peroxide introduced into sulphuric acid and its composition was measured as 9.5% w/w $H_2O_2$ and 37.5% $H_2SO_5$. In Example 7, a further 1 mole of hydrogen peroxide was introduced, and in Example 8, a further 9 moles of hydrogen peroxide introduced, in each case per mole of sulphuric acid employed to make the 1:1 solution.

The results are summarised in Table 2.

TABLE 2

| Example | Total Mole Ratio of reactants $H_2SO_4:H_2O_2$ | Measured Concentration % w/w in the product | |
|---|---|---|---|
| | | $H_2O_2$ | $H_2SO_5$ |
| Ex 7 | 0.5:1 | 23.0 | 28.4 |
| Ex 8 | 0.1:1 | 50.2 | 10.5 |

From Table 2, and by referring also to the results for Examples 3 and 5, it can be seen that this variation also resulted in the effective production of Caro's acid from hydrogen peroxide and sulphuric acid when using in total sub-stoichiometric amounts of sulphuric acid.

We claim:

1. A process for the production of Caro's acid-containing solution by reaction between a concentrated hydrogen peroxide solution and a concentrated sulphuric acid solution wherein the total amount of sulphuric acid employed is substoichiometric relative to the hydrogen peroxide, said process comprising the steps of first forming a body of fluid that is sulphuric acid-rich, and secondly introducing into said body of fluid the hydrogen peroxide solution with agitation, so as to cause the mixture progressively to become sulphuric acid-lean.

2. A process according to claim 1 wherein the total amount of sulphuric acid employed is less than 0.8 moles per mole of hydrogen peroxide.

3. A process according to claim 1 or 2 wherein the body of fluid comprises at least 90% w/w sulphuric acid.

4. A process according to claim 1 or 2 wherein the body of fluid comprises a premix obtained by reacting concentrated hydrogen peroxide solution with at least an equimolar amount of sulphuric acid.

5. A process according to claim 2 wherein the total amount of sulphuric acid employed is in the range of from 0.02 to 0.5 moles per mole of hydrogen peroxide.

6. A process according to claim 4 wherein the total amount of sulphuric acid employed is in the range of from 0.02 to 0.5 moles per mole of hydrogen peroxide.

* * * * *